(12) United States Patent
Leibovich et al.

(10) Patent No.: US 9,348,733 B1
(45) Date of Patent: May 24, 2016

(54) METHOD AND SYSTEM FOR COVERAGE DETERMINATION

(71) Applicant: Cadence Design Systems, Inc.

(72) Inventors: Dan Leibovich, Modiin (IL); Tal Yanai, Tel Mond (IL); Paul Carzola, Wylie, TX (US); Jigar Patel, Murphy, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/535,460

(22) Filed: Nov. 7, 2014

(51) Int. Cl.
*G06F 9/44* (2006.01)
*G06F 11/36* (2006.01)

(52) U.S. Cl.
CPC .................................. *G06F 11/3676* (2013.01)

(58) Field of Classification Search
CPC .................................................. G06F 11/3676
USPC ......................................................... 717/124
See application file for complete search history.

(56) References Cited

U.S. PATENT DOCUMENTS

| | | | |
|---|---|---|---|
| 6,718,521 B1* | 4/2004 | Bentlage et al. | 716/136 |
| 2008/0010535 A1* | 1/2008 | Dasgupta | 714/38 |

* cited by examiner

*Primary Examiner* — Wei Zhen
*Assistant Examiner* — Lanny Ung
(74) *Attorney, Agent, or Firm* — Pearl Cohen Zedek Latzer Baratz LLP

(57) ABSTRACT

A method, system and non-transitory computer readable storage medium for coverage determination of DUT tests. The method may include obtaining via an input device a selection of a subset of interest of coverage reports included in one or a plurality of saved merged coverage reports. The method may further include using a processing unit, finding a saved merged coverage report of said one or a plurality of saved merged coverage reports that has the smallest number of unwanted coverage reports. The method may also include using the found saved merged coverage report to obtain a merged coverage report that corresponds to the subset and merging the merged coverage report with the newly gathered coverage reports into a new merged coverage report.

14 Claims, 6 Drawing Sheets

METHOD AND SYSTEM FOR COVERAGE DETERMINATION

FIELD OF THE INVENTION

The present disclosure relates to coverage (e.g., in software testing). More specifically, the present invention relates to method and system for coverage determination of Device Under Test (DUT) tests.

BACKGROUND OF THE INVENTION

In software testing, a considerable attention is given to coverage. Coverage refers to the extent of which all parts of the tested code have actually been subjected to testing by the test tool.

To measure what percentage of the code has been executed by the test tool, coverage criterion or criteria are used, which essentially are requirement rules that need satisfying in order to verify coverage.

As tests are carried out repeatedly, and may involve long hours or days of repeated test runs, it is useful to determine the percentage of coverage has already been completed.

SUMMARY OF THE INVENTION

There is thus provided, according to some embodiments of the present invention, a method for coverage determination of DUT tests, according to some embodiments of the present invention. The method may include obtaining via an input device a selection of a subset of interest of coverage reports included in one or a plurality of saved merged coverage reports. The method may further include using a processing unit, finding a saved merged coverage report of said one or a plurality of saved merged coverage reports that has the smallest number of unwanted coverage reports. The method may also include using the found saved merged coverage report to obtain a merged coverage report that corresponds to the subset and merging the merged coverage report with the newly gathered coverage reports into a new merged coverage report.

In some embodiments, if the smallest number of unwanted coverage reports is zero, the method may include using the found saved merged coverage report comprises merging the found saved merged coverage with the newly gathered coverage reports.

According to some embodiments, if the smallest number of unwanted coverage reports is greater than zero, the method may include subtracting the unwanted coverage reports from the found saved merged coverage report to obtain the merged coverage report.

In some embodiments, the smallest number of unwanted coverage reports may be less than a number of individual coverage reports making up the subset.

In some embodiments, the method may further include saving the new merged coverage report. The new merged coverage report may be saved into a storage device.

In some embodiments, the method may further include saving information on individual coverage reports making up each of said one or a plurality of saved merged coverage reports. The information may be, for example, identifying information.

According to some embodiments of the present invention, there is provided a non-transitory computer readable storage medium for coverage determination of DUT tests, having stored thereon instructions that when executed by a processor will cause the processor to obtain via an input device a selection of a subset of interest of coverage reports included in one or a plurality of saved merged coverage reports; find a saved merged coverage report of said one or a plurality of saved merged coverage reports that has the smallest number of unwanted coverage reports; and use the found saved merged coverage report to obtain a merged coverage report that corresponds to the subset and merge the merged coverage report with the newly gathered coverage reports into a new merged coverage report.

In accordance with some embodiments of the present invention, there is provided a system for coverage determination of DUT tests. The system may include a storage device and a processing unit, coupled to the storage device. The processing unit may be configured to obtain via an input device a selection of a subset of interest of coverage reports included in one or a plurality of saved merged coverage reports; to find a saved merged coverage report of said one or a plurality of saved merged coverage reports that has the smallest number of unwanted coverage reports; and to use the found saved merged coverage report to obtain a merged coverage report that corresponds to the subset and merge the merged coverage report with the newly gathered coverage reports into a new merged coverage report.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1:
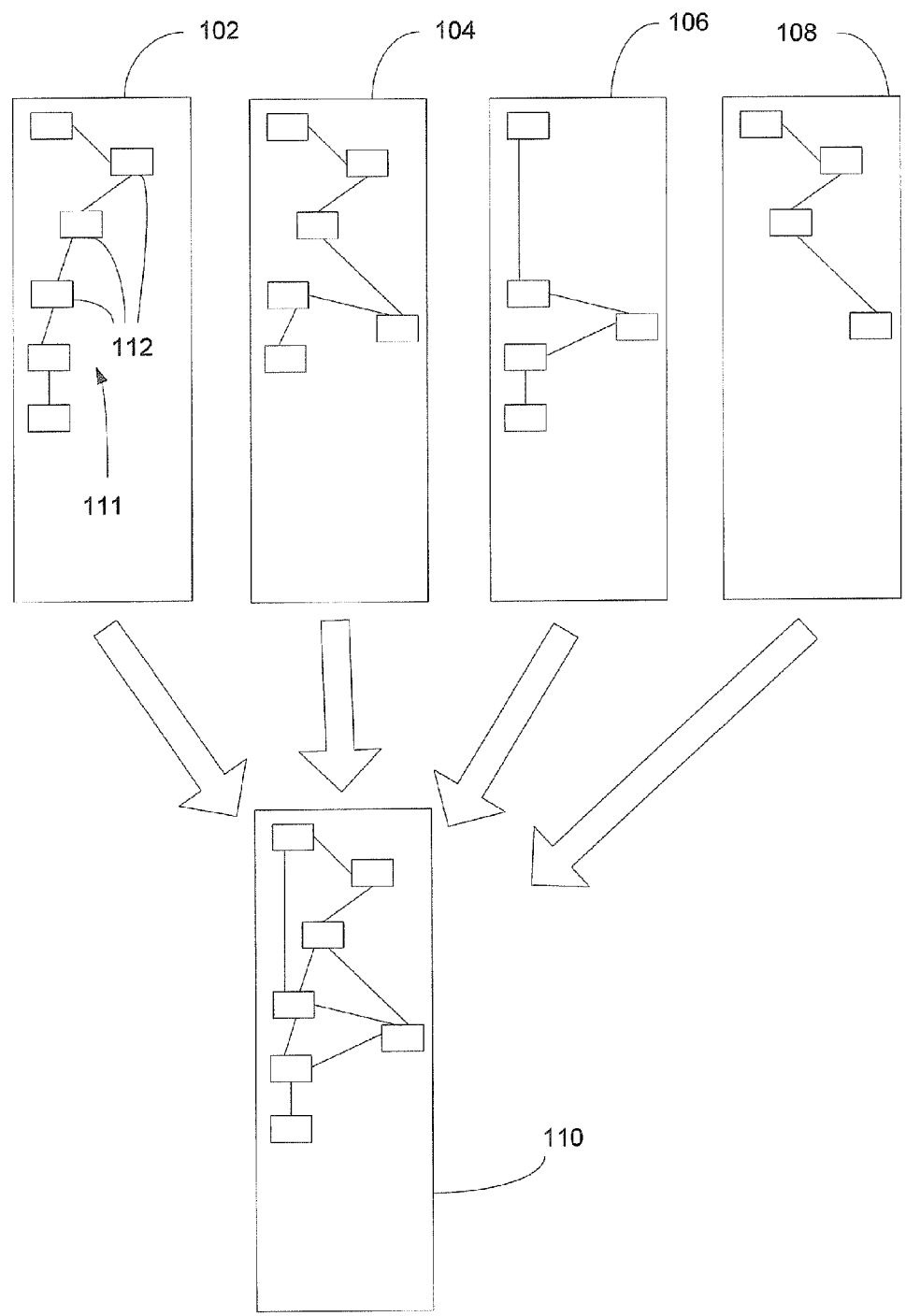
FIG. 1 schematically illustrates merging of coverage reports (prior art) into a single merged coverage report.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Coverage metrics (e.g., line coverage, finite state machine (fsm) coverage, expression coverage, block coverage, toggle coverage and branch coverage) are typically extracted automatically by a code coverage tool, providing information on the parts of the design under test (DUT) that have been executed. There is no automatic method of correlating between the functionality to be tested of the DUT and actual implementation of the functionality.

Functional coverage refers to the extent of which functionality of the DUT has been exercised by the verification environment. Typically, functional coverage is user defined, mapping to every functionality that it is desired to test (according to a test plan) to a coverage point. Each time functionality is executed in a test, the coverage point corresponding to that functionality is updated.

Functional coverage reports are typically generated for each test. Functional coverage reports provide coverage information for each test. While the present specification discusses hereinafter embodiments relating to functional coverage, some embodiments of the present invention may refer to coverage determination of other type or types of coverage metrics.

The generated coverage reports may also undergo additional post-processing, such as, for example, grading the reports (e.g., in correlation with the coverage extent), mapping, excluding coverage reports that are of no or lesser interest (typically because of very low coverage), etc.

As more and more tests are conducted, coverage reports are accumulated, each report indicating a certain percentage of coverage related to its corresponding test. However, the overall coverage percentage is not necessarily the sum of the coverage percentages of the various tests. In fact, it is usually not so, as in many instances tests differ from each other only slightly, resulting in coverage that partially overlaps the coverage of previous test or tests.

In order to determine the overall coverage, single test coverage reports may be merged, projected one on top of the other to a single merged coverage report. When merging coverage tests, identical coverage is identified and not counted more than once. The merged coverage reports present a unified functional coverage report, relating to all of the tests whose coverage reports were merged.

Projecting a single coverage report of an individual tests on top of a second coverage report relating to the same design being tested, for unifying coverage grades into a single coverage result is an easy task when only two coverage reports are considered. However, in practice, numerous coverage reports are accumulated when testing a DUT.

Merging is typically a user-initiated operation, requiring some skill to choose the right moment to merge coverage reports, as the merge itself is a time consuming operation (given that typically thousands, tens of thousands, hundreds of thousands, and even millions of coverage reports may be projected to a single merged coverage report at a time).

Typically, to-date, when additional coverage reports are further accumulated, the next time the user (or another user, hereinafter—the user, for brevity) would want to assess the overall coverage, the entire set of accumulated coverage reports—both the previously accumulated reports, and the newly accumulated coverage reports would be merged together, disregarding the previously obtained merged coverage report.

Consider, for example, the accumulation of millions of coverage reports during tests carried out on a specific DUT. After running a large number (e.g. thousands, tens of thousands, etc.) of tests, the user (typically a person conducting the tests) may wish to analyze the accumulated coverage thus far. The user would merge all coverage reports accumulated up to that point into a single merged coverage report. Generating the merged coverage report is bound to take a considerable amount of time. Further, after completing additional large number (e.g. thousands, tens of thousands, etc.) of tests, in order to analyze the new results and incorporate them with the older accumulated results, the user would typically merge all coverage reports gathered thus far, that is, all of the newly gathered coverage reports, together with all of the older coverage reports, ignoring the previously obtained merged coverage report.

According to some embodiments of the present invention, it is suggested to consider avoiding the merging of an entire set of the previously gathered coverage reports with the newly gathered coverage reports.

As the user (or users) advances with the tests, it is suggested, according to some embodiments of the present invention, to collect the merged coverage reports, and save them for future reference, such as, in the examples that follow.

In some instances, according to some embodiments of the present invention, it is suggested to merge the newly accumulated coverage reports with the merged coverage report. This would be useful if the user wants to consider the both the entire set of merged coverage reports with the newly gathered coverage reports.

Thus, instead of merging the individual coverage reports that have previously been merged with the newly gathered coverage reports, according to some embodiments of the present invention, the newly gathered coverage reports are each projected onto the already merged coverage reports by appending them to the merged coverage report.

There may be instances in which the user would not want to merge the newly gathered coverage reports with all of the coverage reports that where merged into a merged coverage report. The user may be only interested in some of the previously merged coverage reports. For example, typically a user would merge coverage reports of several test sessions. At a later time, the user may be interested in considering only coverage reports of one or some of these sessions. In other instances, the user may be interested in another subset of the previously merged coverage reports, with respect to the newly gathered coverage reports.

FIG. 1 schematically illustrates merging of coverage reports (prior art) into a single merged coverage report. A plurality of tests are carried out, each of which results in an individual coverage report (e.g., coverage reports 102, 104, 106, 108).

Each coverage report typically forms a tree 111 that includes DUT elements 112 that were covered in that particular test as nodes of that tree, connected by edges representing the logic flow that connected the DUT elements in that test.

The individual coverage reports are merged into a single merged coverage report 110, by projecting the individual coverage reports one on top of the other. That way, DUT elements that were covered by at least one test get to be represented in the merged coverage report. DUT elements that were covered in more than one test appear only once in the merged coverage report.

Figure 2:
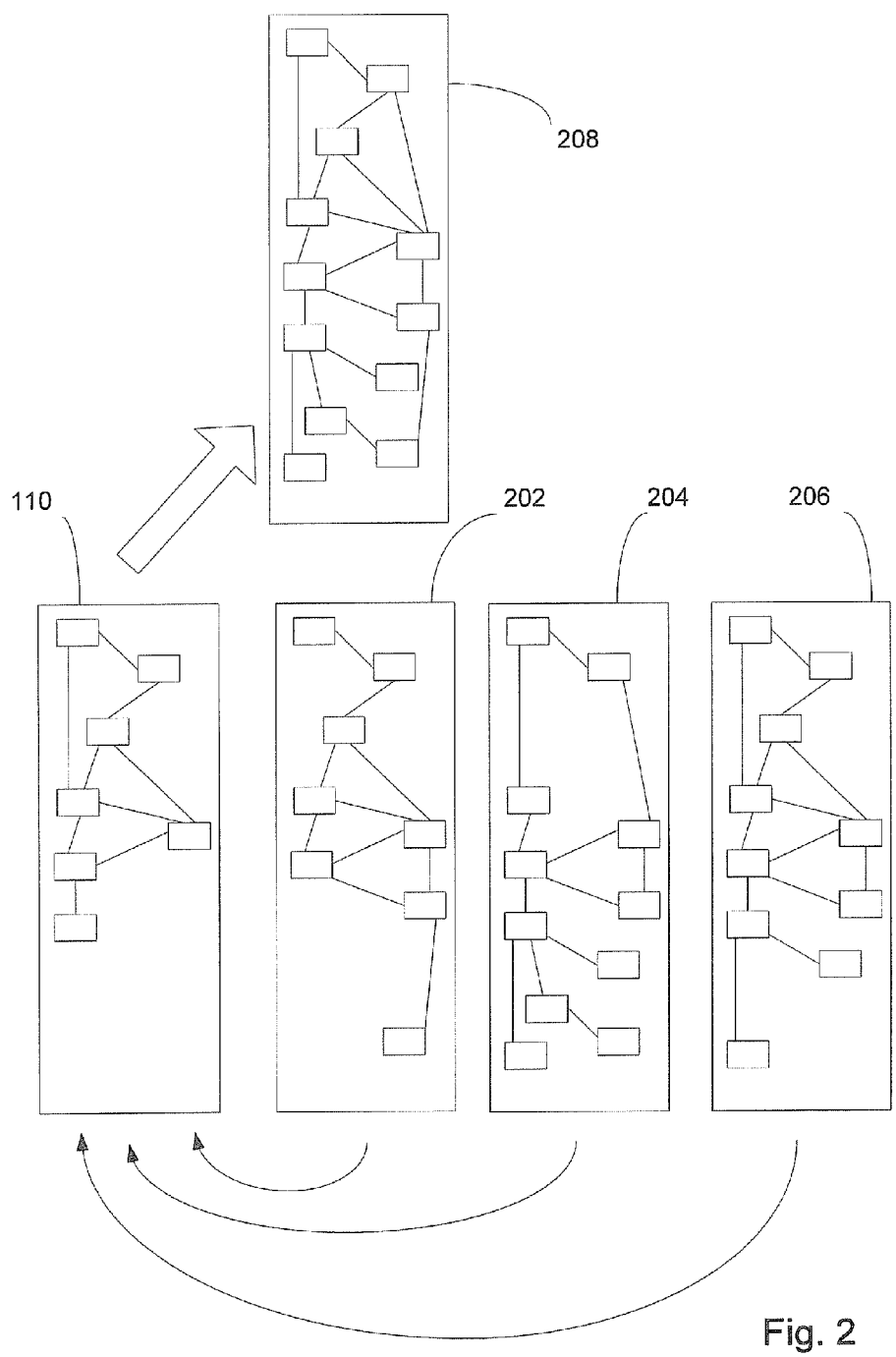
FIG. 2 schematically illustrates merging of newly gathered coverage reports with a saved merged coverage report, according to some embodiments of the present invention into a new merged coverage report.

FIG. 2 illustrates merging newly gathered coverage reports with a saved merged coverage report, according to some embodiments of the present invention, into a new merged coverage report.

Newly gathered coverage reports 202, 204, 206 and 208, are merged with saved merged coverage report 110, by projecting each of the newly gathered coverage reports onto merged coverage report 110. This may be done when the user is interested in projecting all of the previously gathered coverage reports (the ones that have been merged in the merged coverage report 110) as well as the newly gathered coverage reports 202, 204, 206 and 208. Merging all these coverage reports by projecting the newly gathered coverage reports onto the merged coverage report, may save considerable time, as it makes it unnecessary to project all of the previously gathered coverage reports (that have been merged in the merged coverage report 110), considerably shortening the processing time.

Sometimes, the user may be interested in projecting the newly gathered coverage reports onto a subset of the merged coverage report. For example, the user may be interested in a the coverage reports that were generated during a particular session, one of a few sessions whose generated coverage reports have been merged into the saved merged coverage report. In other instances, the user may be interested in any other particular subset of coverage reports of the merged coverage report.

There may be two ways of separating a subset of coverage reports form an entire set of coverage reports that were merged into a merged coverage report, and merging them with the newly gathered coverage reports.

One way would be to select the individual coverage reports of interest and project each of them with the newly gathered coverage reports into a new merged coverage report.

According to some embodiments of the present invention, it is suggested consider another approach and assess whether the other approach is better suited, considering the anticipated processing time.

As the processing time of merging coverage reports directly depends on the number of coverage reports to be projected, it is suggested to consider several approaches, and choose the one that requires the least time to process:

a) merge individual coverage reports of the subset with the newly gathered coverage reports to form a new merged coverage report; or b) subtract from the merged coverage report the unwanted coverage reports, leaving just the subset of coverage reports of interest, onto which the newly gathered coverage reports may be projected to form a new merged coverage report.

In order to determine which approach to take, it is suggested to check whether the subset of coverage reports of interest makes up more than 50 percent of the saved merged coverage report or less than 50 percent of the saved merged coverage report. It is asserted that if the subset of coverage reports of interest makes up more than 50 percent of the saved merged coverage report, then it would take less processing time to subtract unwanted coverage reports from the saved merged coverage report than to merge the individual coverage reports of the subset.

Figure 3A:
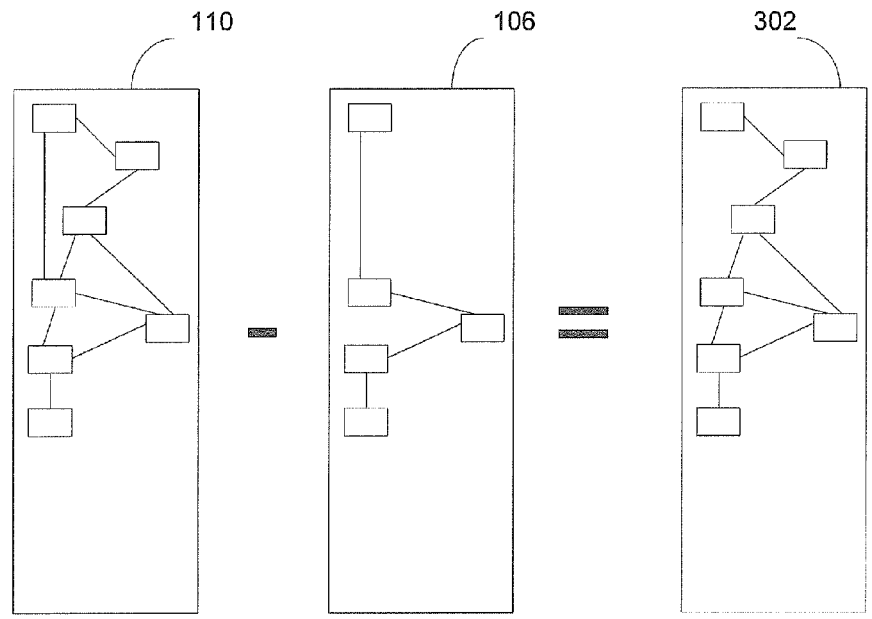
FIG. 3A schematically illustrates obtaining a subset of a merged coverage report by subtraction, according to some embodiments of the present invention.
Figure 3B:
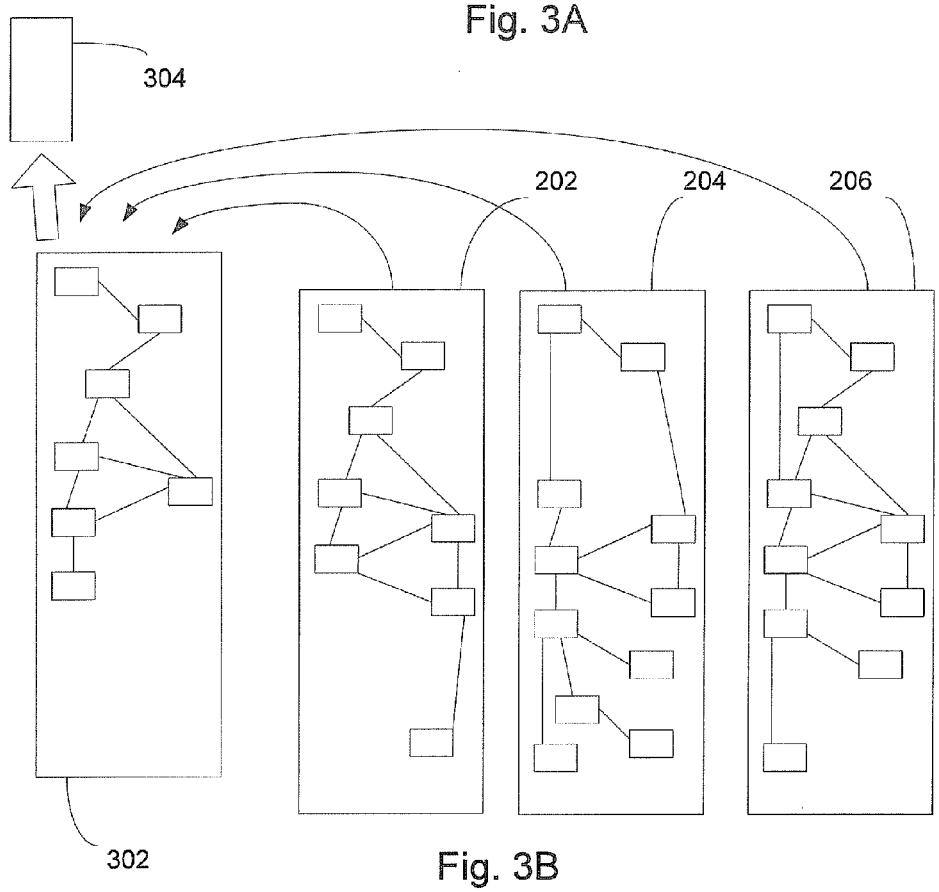
FIG. 3B schematically illustrates merging of newly gathered coverage reports with the subset obtained by subtraction (FIG. 3A), according to some embodiments of the present invention.

FIG. 3A schematically illustrates obtaining a subset of a merged coverage report by subtraction, according to some embodiments of the present invention.

Subtraction, in the context of the present specification, refers to the opposite action to projecting a coverage report onto another.

In the example illustrated in FIG. 3A, the user is interested in the subset of merged coverage report 110, that includes individual coverage reports 102, 104 and 108 (see FIG. 1), while coverage report 106 is of no interest to the user, and therefore unwanted. It is evident that the processing time of merging together individual coverage reports 102, 104 and 108 is substantially greater than subtracting coverage report 106 from merged coverage report 110.

Thus, according to some embodiments of the present invention, a coverage tool may calculate the percentage of a subset of interest of a saved merged coverage report, and if it determines that it is greater than 50 percent, the coverage tool would subtract from the saved merged coverage report the unwanted coverage reports that make up the remaining unwanted portion of the saved merged coverage report. In the example of FIG. 3A, coverage report 108 is subtracted from saved merged coverage report 110 to obtain a new merged coverage report 302 that corresponds to the subset of interest.

After obtaining the new merged coverage report corresponding to the subset of interest, the newly gathered coverage reports 202, 204 and 206 may be projected onto new merged coverage report 302, to obtain a newer coverage report 304 (its tree not shown, for brevity) of the subset of interest and the newly gathered coverage reports.

As DUT testing progresses, many merged coverage reports may be accumulated and saved. Some of the saved merged coverage reports are likely to completely or partially overlap other merged coverage reports of the saved merged coverage reports.

Therefore, it may be useful, when contemplating the merging of newly gathered coverage reports with a subset of coverage reports of interest (of previously gathered coverage reports) to consider the saved coverage reports and search for a saved coverage report in which obtaining the subset of interest by subtraction would require subtracting the least number of coverage reports compared to the other saved coverage reports in which that subset exists. In saved merged coverage reports of roughly the same size, the saved merged coverage report that makes up the greatest percentage of the entire saved merged coverage report, compared to the other saved coverage reports, would be selected.

Figure 4:
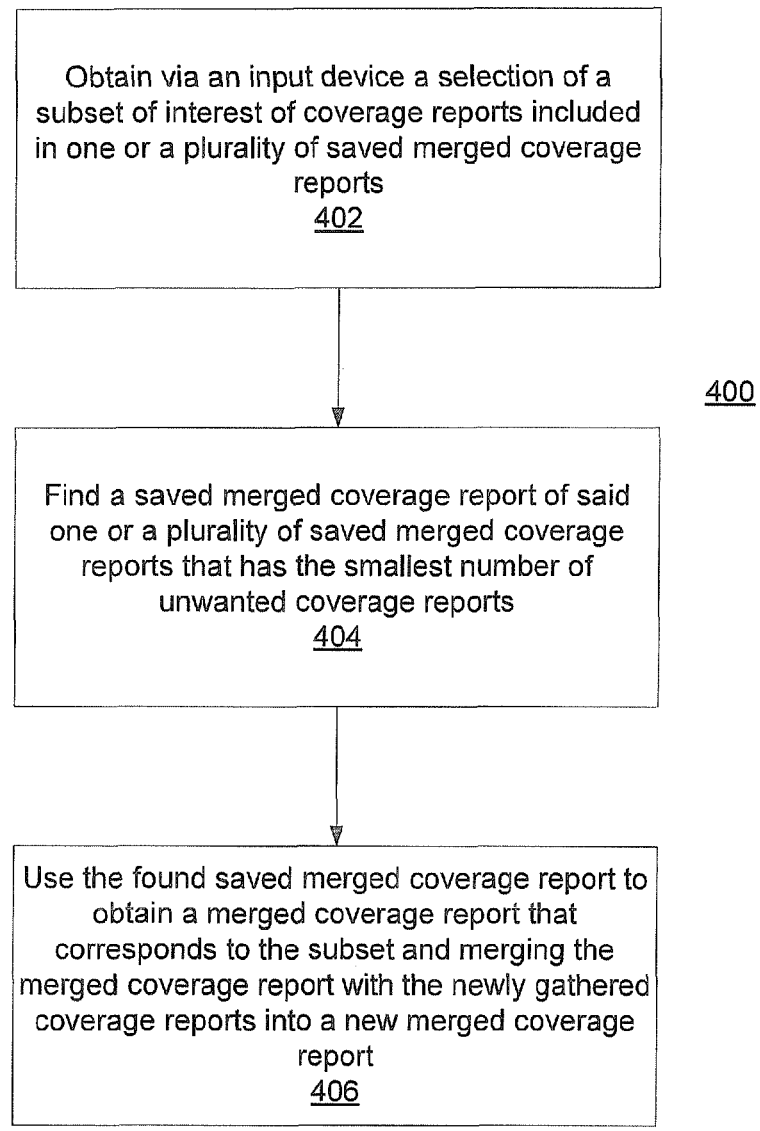
FIG. 4 illustrates a method for coverage determination of DUT tests, according to some embodiments of the present invention.

FIG. 4 illustrates a method 400 for coverage determination of DUT tests, according to some embodiments of the present invention. Method 400 may include obtaining 402 via an input device a selection of a subset of interest of coverage reports included in one or a plurality of saved merged coverage reports. Method 400 may further include using a processing unit, finding 404 a saved merged coverage report of said one or a plurality of saved merged coverage reports that has the smallest number of unwanted coverage reports. Method 400 may also include using 406 the found saved merged coverage report to obtain a merged coverage report that corresponds to the subset and merging the merged coverage report with the newly gathered coverage reports into a new merged coverage report.

In some embodiments, if the smallest number of unwanted coverage reports is zero, the method may include using the found saved merged coverage report comprises merging the found saved merged coverage with the newly gathered coverage reports.

According to some embodiments, if the smallest number of unwanted coverage reports is greater than zero, the method may include subtracting the unwanted coverage reports from the found saved merged coverage report to obtain the merged coverage report.

In some embodiments, the smallest number of unwanted coverage reports may be less than a number of individual coverage reports making up the subset.

In some embodiments, the method may further include saving the new merged coverage report. The new merged coverage report may be saved into a storage device.

In some embodiments, the method may further include saving information on individual coverage reports making up each of said one or a plurality of saved merged coverage reports. The information may be, for example, identifying information.

Figure 5:
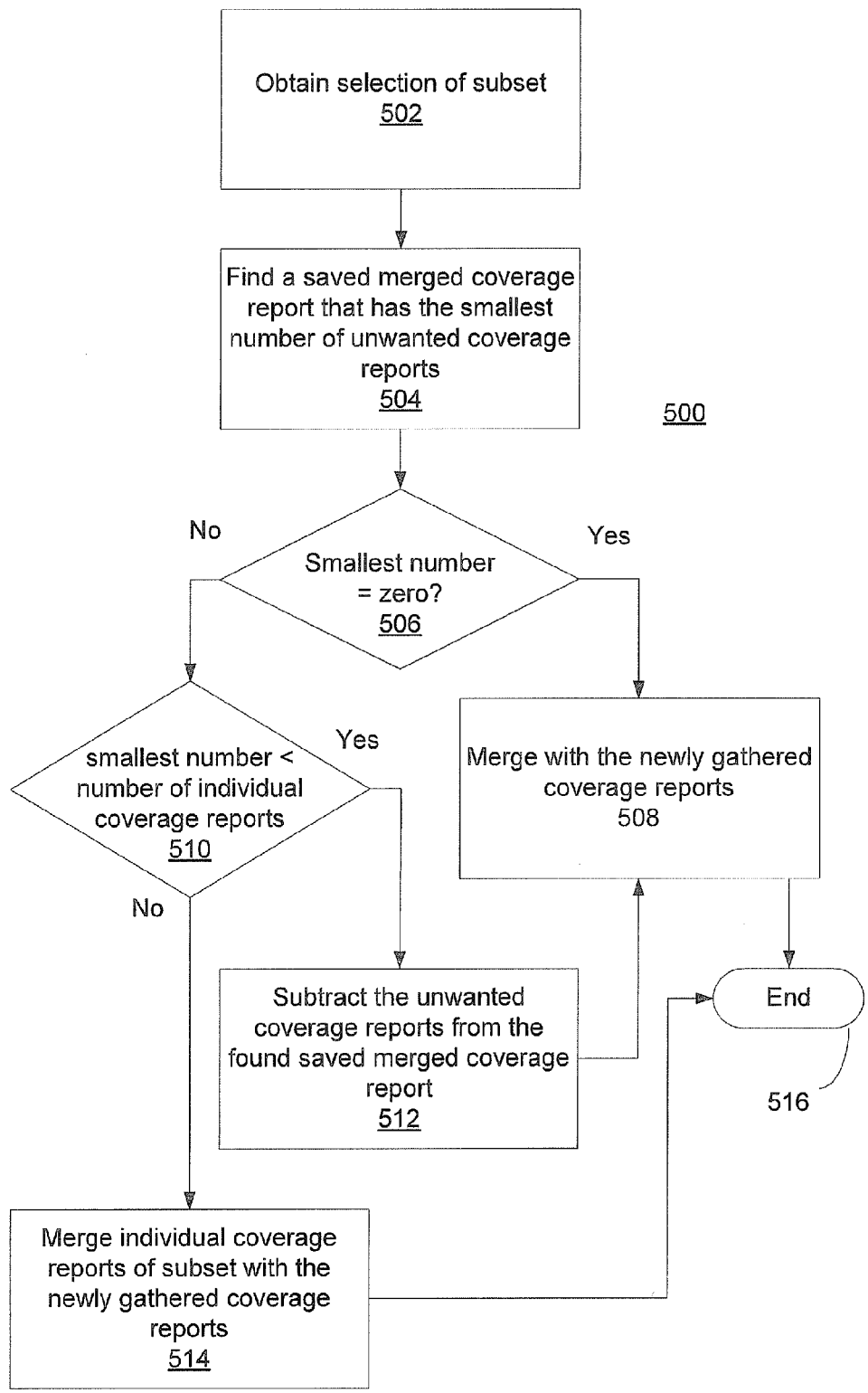
FIG. 5 illustrates an algorithm of a coverage tool for coverage determination of DUT tests, according to some embodiments of the present invention.

FIG. 5 illustrates an algorithm 500 of a coverage tool for coverage determination of DUT tests, according to some embodiments of the present invention.

Algorithm 500 may include obtaining 502 selection of a subset, for example, by a user using an input device. The input device can be, for example, a pointing device, a keyboard, touch screen, or a combination thereof.

The coverage tool then searches within a plurality of saved merged coverage reports to find 504 a saved coverage report that includes the subset and has the smallest number of unwanted coverage reports.

The coverage tool then determines 506 whether the smallest number is zero or not. If the smallest number is zero then the found saved merged coverage report is merged 508 with the newly gathered coverage reports, and terminates 516.

If the smallest number is not zero, then the coverage tool moves on to determine 510 whether the smallest number is less than the number of individual coverage reports making up the subset. If the smallest number is less than the number of individual coverage reports making up the subset, then the coverage tool subtracts 512 the unwanted coverage reports from the found saved merged coverage report, and merges 508 the resulting subtracted merged coverage report with the newly gathered coverage reports, and terminates 516.

If the smallest number is not less than the number of individual coverage reports making up the subset, then the coverage tool merges 514 the individual coverage reports making up the subset with the newly gathered coverage reports, and terminates 516.

Figure 6:
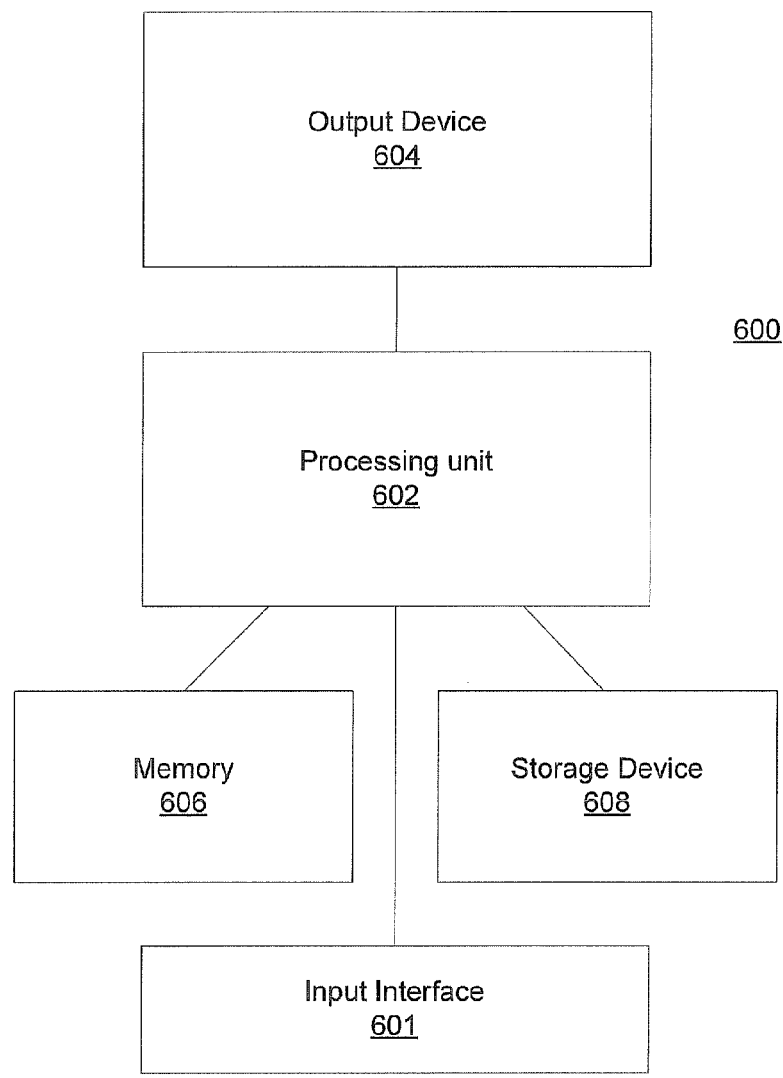
FIG. 6 illustrates a system for coverage determination of DUT tests, according to some embodiments of the present invention.

FIG. 6 illustrates a system 600 for coverage determination of DUT tests, according to some embodiments of the present invention.

System 600 may include a processing unit 602 (e.g., one or a plurality of processors, on a single machine or distributed on a plurality of machines) for executing a method according to some embodiments of the present invention.

System 600 may include an input interface 601 for receiving data and instructions from a user, such as, for example, one or a plurality of keyboards, pointing devices, touch sensitive surfaces (e.g. touch sensitive screens), etc. for allowing a user to input commands and data. Processing unit 602 may be linked with memory 606 on which a program implementing a method according to some embodiments of the present invention and corresponding data may be loaded and run from and data may be saved, and storage device 608, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 604 (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for coverage determination of DUT tests, the method comprising:
saving a plurality of merged coverage reports, each of which comprises projected individual test coverage reports;
obtaining via an input device a selection of a subset of interest of coverage reports included in the plurality of saved merged coverage reports; and
using a processing unit:
finding a saved merged coverage report of said plurality of saved merged coverage reports that has the smallest number of unwanted coverage reports not included in the subset of interest; and using the found saved merged coverage report to obtain a merged coverage report that corresponds to the subset and merging the merged coverage report that corresponds to the subset with newly gathered coverage reports into a new merged coverage report, wherein the method further comprises calculating a percentage of the subset of interest of the found saved merged coverage and determining whether the percentage is greater than 50 percent, and if the percentage is determined to be greater than 50 percent, subtracting the unwanted coverage reports from the found saved merged coverage report to obtain the merged coverage report that corresponds to the subset.

2. The method of claim 1, wherein, if the smallest number of unwanted coverage reports is zero, using the found saved merged coverage report comprises merging the found saved merged coverage with the newly gathered coverage reports.

3. The method of claim 1, wherein, if the smallest number of unwanted coverage reports is greater than zero, the method comprises subtracting the unwanted coverage reports from the found saved merged coverage report to obtain the merged coverage report.

4. The method of claim 1, further comprising saving the new merged coverage report.

5. The method of claim 1, further comprising saving information on individual coverage reports making up each of said one or a plurality of saved merged coverage reports.

6. A non-transitory computer readable storage medium for coverage determination of DUT tests, having stored thereon instructions that when executed by a processor will cause the processor to save a plurality of merged coverage reports, each of which comprises projected individual test coverage reports;

obtain via an input device a selection of a subset of interest of coverage reports included in the plurality of saved merged coverage reports;

find a saved merged coverage report of said plurality of saved merged coverage reports that has the smallest number of unwanted coverage reports not included in the subset of interest; and use the found saved merged coverage report to obtain a merged coverage report that corresponds to the subset and merge the merged coverage report that corresponds to the subset with newly gathered coverage reports into a new merged coverage report, wherein the non-transitory computer readable storage medium further includes instructions stored thereon that when executed on the processor will cause the processor further to calculate a percentage of the subset of interest of the found saved coverage and determine whether the percentage is greater than 50 percent, and if the percentage is determined to be greater than 50 percent, subtract the unwanted coverage reports from the found saved merged coverage report to obtain the merged coverage report that corresponds to the subset.

7. The non-transitory computer readable storage medium of claim 6, wherein, if the smallest number of unwanted coverage reports is zero, using the found saved merged coverage report comprises merging the found saved merged coverage with the newly gathered coverage reports.

8. The non-transitory computer readable storage medium of claim 1, wherein, if the smallest number of unwanted coverage reports is greater than zero, the instructions when executed by a processor will cause the processor to subtract the unwanted coverage reports from the found saved merged coverage report to obtain the merged coverage report.

9. The non-transitory computer readable storage medium of claim 6, wherein the instructions when executed by a processor will further cause the processor to save the new merged coverage report.

10. The non-transitory computer readable storage medium of claim 6, wherein the instructions when executed by a processor will further cause the processor to save information on individual coverage reports making up each of said one or a plurality of saved merged coverage reports.

11. A system for coverage determination of DUT tests, the system comprising:

a storage device; and a processing unit, coupled to the storage device and configured to:

save a plurality of merged coverage reports, each of which comprises projected individual test coverage reports;

obtain via an input device a selection of a subset of interest of coverage reports included in the plurality of saved merged coverage reports;

find a saved merged coverage report of said plurality of saved merged coverage reports that has the smallest number of unwanted coverage reports not included in the subset of interest; and use the found saved merged coverage report to obtain a merged coverage report that corresponds to the subset and merge the merged coverage report that corresponds to the subset with newly gathered coverage reports into a new merged coverage report, wherein the processing unit is further configured to calculate a percentage of the subset of interest of the found saved merged coverage and determine whether the percentage is greater than 50 percent, and if the percentage is determined to be greater than 50 percent, subtract the unwanted coverage reports from the found saved merged coverage report to obtain the merged coverage report that corresponds to the subset.

12. The system of claim 11, wherein, if the smallest number of unwanted coverage reports is zero, in using of the found saved merged coverage report the processing unit is configured to merge the found saved merged coverage with the newly gathered coverage reports.

13. The system of claim 11, wherein, if the smallest number of unwanted coverage reports is greater than zero, the processing unit is configured to subtract the unwanted coverage reports from the found saved merged coverage report to obtain the merged coverage report.

14. The system of claim 11, wherein the processing unit is further configured to save the new merged coverage report.

* * * * *